Patented Jan. 11, 1944

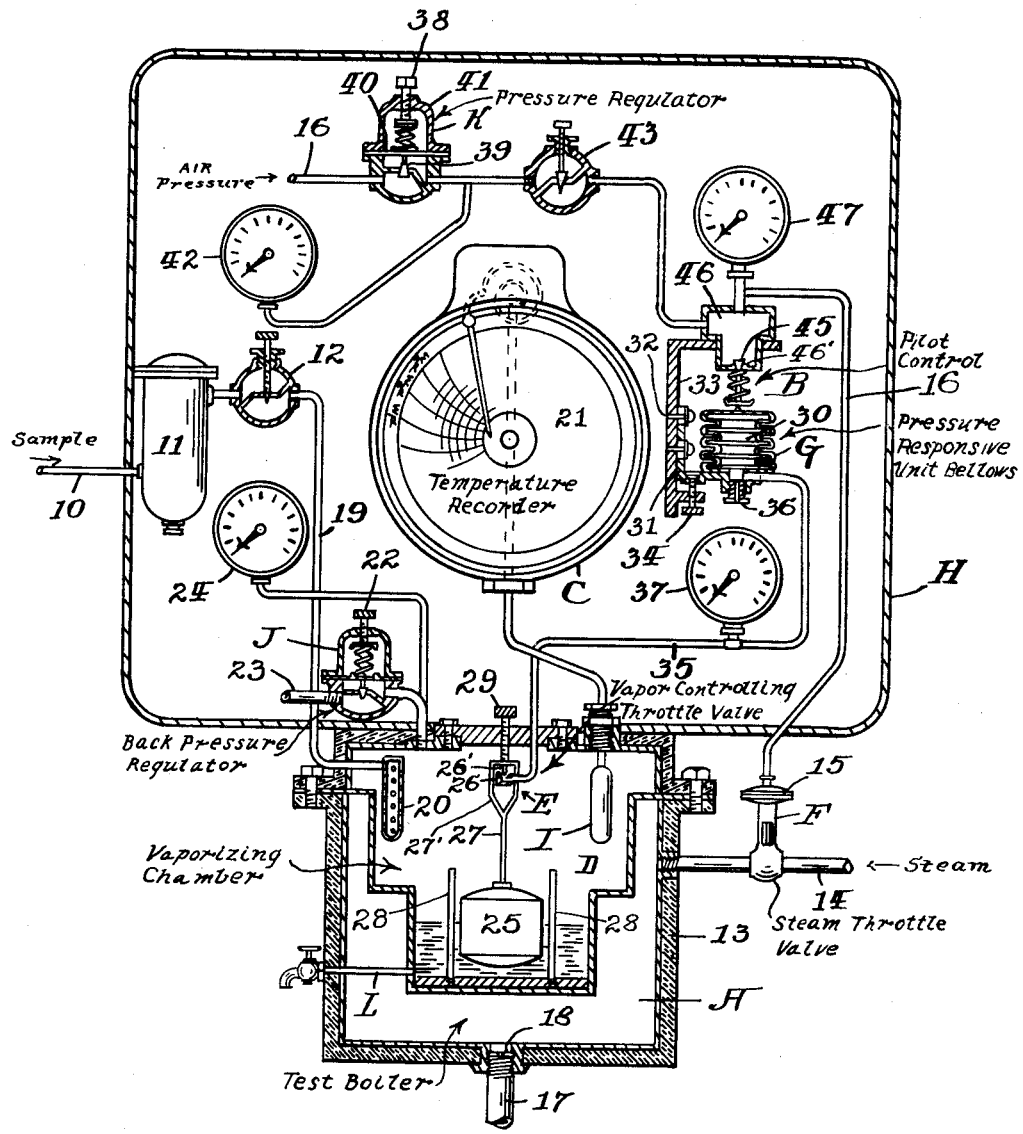

2,339,026

UNITED STATES PATENT OFFICE 2,339,026

METHOD OF AND APPARATUS FOR MEASURING AND TESTING THE END POINT OF VOLATILE LIQUIDS

William M. Mercer, Avenal, Calif., assignor of one-half to Frederick D. Bradbury, Avenal, Calif.

Application December 27, 1941, Serial No. 424,630

6 Claims. (Cl. 73—50)

My invention relates to an improved method of and apparatus for measuring and recording the end point of gasoline and other volatile products manufactured by various types of distilling apparatus. One of the objects of this invention is to provide means for continuously measuring and recording the end point (the temperature at which the heaviest component of a volatile liquid will vaporize) of a product produced by distillation, fractionation and other volatile treating systems. Therefore, one of the uses for this invention is in the manufacture of gasoline. The apparatus possesses other features and applications that will be apparent from the following description including the accompanying drawing.

The single figure of the drawing is a schematic plan of my invention, part of the apparatus being shown in plan, part in side elevation, and part in section, for the purpose of more fully illustrating the complete invention in a single view.

My invention is shown in the drawing and described as applied to a gasoline product but it will be equally applicable to any hydrocarbon, alcohol or other product of distillation. The apparatus is also illustrated as using a steam heated boiler, but any other heating medium can be used with proper coupling between the float and the boiler and the heating element. For instance an electrical heating element (not shown and of well known type) can be substituted for the steam boiler without departing from the spirit of the invention.

The apparatus employed makes its measurement and recording on a small sample stream of the volatile liquid from a distillation system or other source of production or storage (not shown). This sample stream is of constant volume and enters a vaporization chamber of a specialized test boiler. This boiler is steam heated, the degree of heat to which it is subjected being dependent upon the end point of the fluid which is tested. The test stream, upon entering the test boiler is partially vaporized; the vapors being maintained within the chamber at a predetermined pressure, and all excess pressure being bled off through a sensitive back pressure regulator. The heavier components of the test stream are trapped in a vaporization chamber within the boiler in a liquid condition. By using the level of the liquid within the vaporizing chamber as the means for monitoring the heat applied to said chamber, an equilibrium condition is established wherein only the heaviest component of the test stream is trapped in a liquid condition, and this heaviest component is vaporized at a rate equal to that at which it accumulates. The liquid level will reflect any variations in the heaviest component being trapped and in turn cause to be set up a new temperature that will maintain a new equilibrium that will cause its vaporization at a rate equal to its accumulation as the equilibrium temperature is varied.

Since the heaviest component is continuously trapped and vaporized at a constant pressure, the temperature within the vaporization chamber is substantially the end point of the sample stream. Such temperature variations can be recorded continuously on any of several well known makes of temperature recorders. Apparatus for making this measurement is described as follows:

The apparatus employed makes its measurement and recording on a small sample stream of the volatile liquid to be tested, and is shown in the drawing as entering my improved measuring and recording device by the ingress duct 10 and through filter 11 by which the liquid is cleaned. The stream is continuous and held constant in volume by orifice fitting 12 which may be adjusted to permit passage of sufficient volume for the successful operation of the test boiler A and the associated controlling and recording mechanisms B and C, to be described. In the event that the source of the test stream does not provide said test stream at a constant pressure, a suitable pressure regulator (not shown) is inserted in the ingress duct 10 ahead of the orifice fitting 12, so as to maintain a test stream of constant volume.

The apparatus employed is enclosed in a suitable housing H to the lower portion of which is appended the test boiler A within an insulated jacket 13. This jacket is adapted to contain a steam bath from the source of steam supply (not shown) leading thereinto for heating the boiler and its vaporizing chamber through the steam supply duct 14. The temperature of the test boiler and its vaporizing chamber is varied by controlling the amount of steam passing through the jacket. This control is effected by means of a steam throttle valve F which may be of standard make and is illustrated as a gas or air operated diaphragm motor valve of the normally open type. The air or gas supply for the operation of the steam throttle valve originates from any suitable source and is reduced to a steady predetermined pressure, which may effectively be 15 pounds to the square inch, and is monitored by the pressure responsive unit G of the control mechanism B.

The pressure of the vapor within the vaporizing chamber D of the test boiler is held substantially constant by means of a sensitive back pressure regulator J, which may be of any standard make, and should be adjustable so that the pressure held within the vaporization chamber may be varied to meet the demands of any particular fluid being tested. The excess vapors are bled off through this regulator and may be returned to a vacuum or low pressure gasoline line via duct 23. The drawing shows this regulator as controlled by thumb screw 22. The pressure of the vapors in the vaporization chamber is indicated on gauge 24. Practice indicates that this pressure is approximately 20 pounds to the square inch when the apparatus is handling gasoline, but it is understood that this pressure may vary with each product being tested. Condensation from the heating fluid used in the boiler may be exhausted through vent 17 which contains a suitable interchangeable orifice plate 18.

The sample stream of the liquid whose end point is to be determined and recorded is conducted from the orifice fixture 12 into the vaporizing chamber of the test boiler by duct 19 and is aided in being vaporized by injecting it in the form of a spray through a suitable nozzle 20. Through proper temperature adjustment, automatically achieved as hereinafter described, distillation of the test stream is so controlled that only the heaviest component of said test stream is trapped in liquid condition as a dominant pool. In addition to this, through the same control medium, a rate of vaporization of this heaviest component is maintained, equal to the rate at which it accumulates. Under these equilibrium conditions, the temperature within the vaporizing chamber is substantially the end point of the fluid in the test stream. This temperature of the vaporization chamber is scribed on the chart 21 of the continuous temperature recorder C, of usual construction, controlled by means of the recording bulb I supported near the top of the chamber.

This equilibrium between the vaporization and accumulation of the heaviest component of the test stream, is reflected in the stationary fluid level within the vaporization chamber of the test boiler. Any changes in the end point of the test stream, disturbs the equilibrium conditions and will be indicated in either a raising or lowering of said fluid level. By using the fluid level as a monitor of the temperature, it is possible to establish automatically, equilibrium conditions that will substantially indicate the end point of the test stream as it varies. This coupling between the fluid level and temperature control is as follows:

The vaporization chamber contains float 25, resting in the dominant pool, and guided in its movement by pins 28 which provide an annular space sufficient to permit free functioning. This float is coupled to a vapor controlling throttle valve E of the controlling mechanism by arm 27. This vapor throttle valve is located within the vaporizing chamber of the test boiler, and consists of a suitable rigidly supported seat 26 and needle valve stem 26', the latter depending rigidly within a yoke 27' on the upper end of said arm. Vapors passed by the throttle valve are conducted out of the vaporizing chamber through tubular duct 35. The needle valve 26' is limited in its operation and held in its seat by the adjustable stop screw 29 which is threaded in a suitable support such as part of the housing H. As the level of liquid rises in the vaporizing chamber, the float lifts the needle valve 26' from its seat 26, opening the valve and permitting an increased volume of vapors to pass to the vapor bellows 30 of the pressure controlled monitoring device G, via duct 35. Conversely, a lowering of the liquid level drops the float, closing the throttle valve 26' and thereby reducing the flow of vapors to said bellows.

The vapor bellows unit 30 is mounted on adjustable support 31 guided by screws 32 extending through the movable member and attached to the fixed base 33. Adjustment of the position of the bellows is accomplished by thumb screw 34 threaded through an angle on said base.

The bellows 30 receives a modulated flow of vapors from the vapor throttle valve 26', through the connecting duct 35. Expansion of the bellows 30 is dependent on the pressure resulting from the restriction of the flow of vapors by the adjustable orifice 36 which permits the vapors to bleed to atmosphere, and the amount of vapors passing through the system as controlled by the vapor throttle valve 26'. This bleed can be at any point along duct 35 and is shown in the drawing as being installed on the support for the vapor bellows. The bleed can be varied as desirable by changing the orifice 36. Since the said orifice is constant for a given liquid and the pressure of the vapors is constant as controlled by regulator J, expansion of the bellows depends solely on the amount of vapors passing through the throttle valve 26' and is proportional thereto. The pressure of the vapor in the bellows is indicated by the pressure indicator 37.

Variations in the expansion of the vapor bellows is utilized in controlling the pressure of the pilot air or gas used in activating the diaphragm control motor 15 of the steam throttle valve F. This throttle valve is of the normally open type and is closed by increasing the pressure of the activating medium. Conversely, the valve is opened by decreasing the pressure of the activating medium. This medium, air or gas, is supplied to this system from any convenient source (not shown) via duct 16, and is reduced to a satisfactory pressure by regulator K. In practice, this pressure has been found to be approximately 15 pounds per square inch. However the pressure may vary according to the demands of the steam throttle valve, and hence, it is desirable that regulator K be of an adjustable type. The drawing shows such a regulator controlled by thumb screw 38, and having the usual automatic check valve 39, motoring diaphragm 40 and housing 41. Gauge 42, in the outlet side of the regulator indicates the pressure delivered by said regulator and aids in its adjustment. The activating medium is delivered to the diaphragm motor 15, via duct 16 and pilot control B.

This pilot control consists of a suitable chamber 46, having an orifice 46', in which is seated a tapered spring controlled check valve 45, normally held closed. Chamber 46 is mounted on the fixed base 33, with the spring closed relief valve in such position that the expansion of the vapor bellows will open it. The activating medium supplied to this chamber is controlled in volume by variable orifice 43. Generally speaking, this orifice passes a smaller flow of gas and air than does the fully opened bellows controlled bleed valve 45. The activating medium supplied by duct 16 is monitored by the expansion of the vapor bellows 30 and is indicated on a suitable pressure gauge 47, which in turn reflects the operation of the steam throttle valve. When the vapor bellows 30 is collapsed, there is no bleed of pressure through valve 45 and the diaphragm motor of the steam throttle valve is subjected to the full pressure delivered by regulator K as indicated on pressure gauge 47. As the vapor bellows expands, it progressively increases the rate of bleed through valve 45 until the full volume of air or gas supplied by regulator K and orifice 43, is released to atmosphere. At such time, the pressure of the operating medium on the diaphragm motor is zero. The system is capable of providing a full range of operating pressures for the steam throttle valve, which are proportional to the expansion of the vapor bellows which in turn is controlled by the fluid level within the vaporizing chamber of the test boiler.

Thus, as the liquid level within the vaporizing chamber of the test boiler rises, it lifts float 25, opening the vapor throttle valve 26', supplying a greater volume of vapor to the vapor bellows 30. Due to the restriction of the flow of vapors by orifice 36 on the vapor bellows, the pressure within the bellows is increased causing it to expand. This expansion brings it into bearing with the relief valve 45, opening the latter and bleeding pressure from the steam throttle valve activating medium. The lessening of this pressure on the diaphragm motor 15 causes the throttle valve F to open permitting more steam to be supplied to the test boiler A, thereby raising the temperature and increasing the rate of vaporization of the sample fluid being tested and lowering the liquid level in said chamber. As the liquid level is reduced, the vapor throttle valve is closed, causing the vapor bellows 30 to contract, permitting the relief valve 45 to close and thereby increasing the pressure on the diaphragm motor which closes the steam throttle valve, reducing the temperature of the boiler, slowing the vaporization of the sample liquid, and thereby raising the liquid level in the vaporizing chamber. The pressure of vapor from the vapor chamber D at which the bellows is actuated is indicated continuously by the pressure indicator 37.

Thus the apparatus establishes a temperature at which the vaporization of the liquid within the vaporizing chamber of the test boiler is in equilibrium with the rate at which it accumulates. Since the fluid trapped in the vaporizing chamber is made up of that portion of the test stream having the highest end point, and since it is being continuously vaporized at a rate equal to that at which it accumulates, and since such vaporization takes place at a constant pressure regardless of the vapor pressure of the liquid in the test stream, the temperature of the vaporization chamber when under such equilibrium conditions represents substantially the end point of the test stream. Such equilibrium conditions will prevail until there is a change in the end point of the sample stream. Any such change will result in a variation of the liquid level, and the apparatus will automatically produce a new temperature at which a new equilibrium will be established between the new fluid level and the new temperature, the latter being substantially the end point of the test stream as it was varied.

The measurement and recording of the end point of the sample stream of liquid, such as gasoline, alcohol or other volatile liquid passing through the apparatus continuously is reflected by the temperature produced in the vaporizing chamber and this temperature is continuously registered and recorded by the temperature recorder C upon the usual recording charts, whereby a constant and complete record is made of the end point of the sample stream.

A valved drain L is shown in the lower portion of the vaporizing chamber for removing any accumulation of a small component periodically which has been found will not vaporize regardless of the temperature and which if not removed might affect the accuracy in the operation of the apparatus. This is particularly the case when the apparatus is used on low grade gasoline. Usually however on higher grade gasoline it has been found that the agitation of the liquid in the vaporizing chamber causes a carry over through the conduit 23 which removes this objectionable component.

In a typical use of my improved end point recorder when operating in connection with the product of an absorption plant, the pressure of the test stream on the plant side of orifice 12 was 80 pounds per square inch. The pressure maintained in the vaporizing chamber by back pressure regulator J was 20 pounds to the square inch. The temperature of the steam used in the test boiler was between 325 and 350 degrees F., and the pressure of the steam admitted by the throttle valve into the boiler jacket was from 0 to 15 pounds per square inch. The maximum pressure of the air source was 200 pounds per square inch and this was reduced by regulator K to approximately 15 pounds to the square inch. The temperature and pressure may be varied to suit the requirements and are not to be considered as limitations.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the spirit thereof and within the scope of the following claims.

I claim:

1. The method of determining the end point of a volatile liquid which comprises supplying a continuous test stream to form a constant pool of the heaviest component of said liquid, heating said liquid, regulating its temperature and subjecting it to constant pressure to sufficiently control vaporizing temperature and maintain an equilibrium between the rate at which the heaviest component of the test stream is supplied and the rate at which it is vaporized, and continuously recording the temperature which provides said equilibrium.

2. The method of determining the end point of a volatile liquid which consists of supplying a continuous sample stream of said liquid of constant volume and subjecting it to substantially constant pressure, accumulating a portion of said test stream under constant pressure in a dominant pool which reflects variations in the end point, subjecting said stream including the dominant pool to a vaporizing temperature that will provide equilibrium between the rate of vaporization of the heaviest component and the rate said component is supplied by the test stream, monitoring the heat applied for maintenance of said equilibrium by the fluid level variations of the dominant pool, and recording the temperature which provides said equilibrium.

3. In a method as defined in claim 2, a further step consisting of using the vapors of constant pressure from the volatilized sample stream as a medium for controlling the heat applied to the test stream and dominant pool, relative to the fluid level variations of said pool.

4. A self contained unit for continuously measuring and recording the end point of a volatile fluid, comprising, a vaporizing chamber, means for introducing to the vaporizing chamber a continuous sample stream of the volatile fluid, means for maintaining the fluid in said chamber at a constant predetermined pressure, means for heating said chamber whereby the lighter components in the sample stream are vaporized leaving a dominant pool containing only the heaviest component in said chamber, means controlled by the fluid level of the dominant pool for regulating the heat applied to the vaporizing chamber whereby the heaviest component of the sample stream is vaporized at the rate said component is introduced into the vaporizing chamber, and means for recording the temperature maintained in the vaporizing chamber which is substantially the end point of the sample stream.

5. A self contained unit for continuously measuring and recording the end point of a volatile fluid, comprising, a vaporizing chamber, means for introducing a continuous sample stream of the volatile fluid of constant volume to the vaporizing chamber, means for maintaining said chamber at a constant predetermined pressure, consisting of a back pressure regulator providing for the release of excess vapors, means for heating said chamber whereby the lighter components in the sample stream are vaporized leaving a dominant pool containing only the heaviest component in said chamber, a valve controlled by the fluid level of the dominant pool for regulating the heat applied to the vaporizing chamber whereby the heaviest component of the sample stream is vaporized at the rate said component is introduced into the vaporizing chamber, and means for recording the temperature maintained in the vaporizing chamber which is the end point of the sample stream.

6. A self contained unit for continuously measuring and recording the end point of a volatile fluid, comprising, a vaporizing chamber from which the sample stream is normally permitted to exhaust only as vapor, means for introducing to the vaporizing chamber a continuous sample stream of the volatile fluid of constant volume, means for maintaining said chamber at a constant predetermined pressure consisting of a back pressure regulator providing for the release of excess vapors, means for heating said chamber whereby the lighter components in the sample stream are vaporized leaving a dominant pool containing only the heaviest component in said chamber, means controlled by the fluid level of the dominant pool for regulating the heat applied to the vaporizing chamber whereby the heaviest component of the sample stream is vaporized at the rate said component is introduced into the vaporizing chamber, said controlled means consisting of a float operated valve and a pressure responsive system, said float operated valve being adapted to pass vapors from the vaporizing chamber in varying degree to the pressure responsive system and said pressure responsive system being adapted to monitor the heat applied to the vaporizing chamber relative to the fluid level in said chamber, and means for recording the temperature maintained in the vaporizing chamber which is substantially the end point of the sample stream.

WILLIAM M. MERCER.